UNITED STATES PATENT OFFICE.

WILLIAM H. WHITE, OF HAZLETON, PENNSYLVANIA, ASSIGNOR OF ONE-HALF TO WINIFRED B. WHITE, OF HAZLETON, PENNSYLVANIA, AND ONE-THIRD TO JACOB M. SCHAPPERT AND MARGARET SCHAPPERT, OF DORRANCETON, PENNSYLVANIA.

PROCESS FOR TEMPERING COPPER.

1,062,067.

Specification of Letters Patent. Patented May 20, 1913.

No Drawing. Application filed March 2, 1912. Serial No. 681,307.

*To all whom it may concern:*

Be it known that I, WILLIAM H. WHITE, a citizen of the United States, and a resident of Hazleton, in the county of Luzerne and State of Pennsylvania, have invented certain new and useful Improvements in Processes for Tempering Copper, of which the following is a specification.

My invention relates to a process of tempering or hardening copper and preferably also cleansing it, although it is possible to temper the copper without making it clean and bright, which however, is obviously desirable.

Generally speaking, my process comprises three steps: first, heating the copper to the proper temperature, which ordinarily is a red heat, although it may be a white heat, where a harder temper is desired in the product; second, immersing the copper at once into a bath of a character to be hereinafter described in detail, and which comprises a hardening ingredient or ingredients and which may also comprise a cleansing ingredient or ingredients, the copper being permitted to remain therein until a hissing sound is heard, this being what is known as the blow point; and third, laying the copper upon a hard surface, preferably a stone, iron or steel plate, striking it a heavy blow with a second hard surface, preferably also, a stone, iron or steel plate large enough to cover the piece of copper being treated, and permitting the plate to remain on the copper until the latter turns from red to a golden tint.

If the copper has been taken out of the bath exactly at the blow point and the operation of tempering has been successful, the copper turns from red to a golden tint. If this result does not occur, the copper should be reheated and the process repeated.

Water forms the base of the hardening or hardening and cleansing bath which I employ. The ingredients added thereto are as suggested of two classes—those which assist in the hardening action and those whose effect is to make the surface of the copper bright and clean. The volume of the bath depends on the size of the plates or other pieces of copper to be treated. I have secured satisfactory results by combining the hardening and cleansing portions of the bath on a half and half basis. As already stated, however, I may omit cleansing ingredients entirely.

The principal hardening ingredient which I prefer to employ is lime water which is alkaline and a hydroxid. Improved results are, however, secured if I add tallow, the latter having the effect of toughening the copper.

The cleansing ingredients may be of a vegetable nature, roots and stalks in particular, for instance clover, yarrow or burdock root, either of which I find effective. I may, however, use either alone or with the roots or stalks, borax.

In preparing the bath, I use proportions which will be indicated in a general way hereinafter, it being understood that these need not be strictly adhered to. I completely slake a peck of lime and then add enough water to make fifteen quarts of the lime water. To this I add fifteen quarts of an infusion from steeping clover, yarrow or burdock. To this I also add a quarter pound of tallow together with a lump of borax the size of an egg. It will be understood that the volume of the bath may vary but in a general way the proportions referred to will be found suitable. As above stated, while I prefer a bath constituted as just described, some of the ingredients may be omitted. The copper heated to the requisite temperature (as hereinbefore stated) is immersed in the said bath, which should first be heated, and is permitted to remain therein a very brief period until it blows as already described. It is then at once withdrawn from the bath, placed on a hard surface and struck a hard blow with another hard surface, both surfaces being preferably iron, steel or stone plates. The upper plate is permitted to remain on the piece of copper until it turns from red to a golden tint.

It will be apparent that I have invented a process of tempering copper which requires no expensive ingredients and which is comparatively simple. A successful process of this nature has long been sought and its advantages are obvious.

What I claim as my invention is:

1. The process of tempering copper comprising the following steps; heating a piece of copper to a high temperature, immersing it in a hardening bath until it blows, and on removing it therefrom, placing it upon a hard surface and striking it with another hard surface.

2. The process of tempering copper comprising the following steps; heating a piece of copper to a high temperature, immersing it in a hardening and cleansing bath until it blows and on removing it therefrom, placing it on a hard surface and striking it with another hard surface.

3. In a process of tempering copper, the step of immersing a piece of copper heated to a high temperature in a bath containing lime water and as soon as it blows removing it therefrom.

4. The process of tempering copper comprising the following steps; heating a piece of copper to a high temperature, immersing it in a hardening bath containing lime water, after a brief period removing it therefrom; then placing it on a hard surface and striking it a hard blow with another hard surface, both surfaces being preferably iron, steel or stone plates, the upper plate being permitted to remain on the piece of copper until it turns from red to a golden tint.

5. In a process of tempering copper, the step of immersing a piece of copper heated to a high temperature in a bath containing lime water and a cleansing ingredient of a vegetable nature and after a brief period removing it therefrom.

6. The process of tempering copper comprising the following steps; heating a piece of copper to a high temperature, immersing it in a hardening and cleansing bath until it blows, said bath containing lime water, burdock, clover, yarrow, borax and tallow, and on removing it therefrom placing it on a hard surface and striking it with another hard surface of sufficient extent to cover the portion of the piece of copper which is to be hardened.

7. In a process of tempering copper, the step of immersing a piece of copper heated to a high temperature in a bath containing lime water and tallow, and after a brief period removing it therefrom.

In testimony whereof I affix my signature in presence of two witnesses.

WILLIAM H. WHITE.

Witnesses:
J. P. COSTELLO,
J. M. SCHAPPERT.